Dec. 6, 1938. G. C. R. KUIPER 2,139,083
VEHICLE BRAKE
Filed Aug. 21, 1935
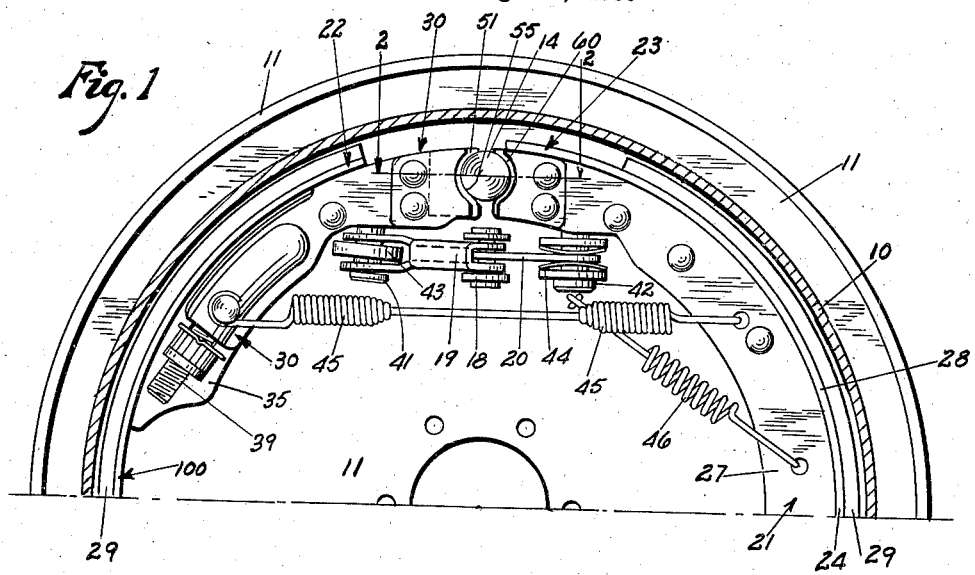
Fig. 1
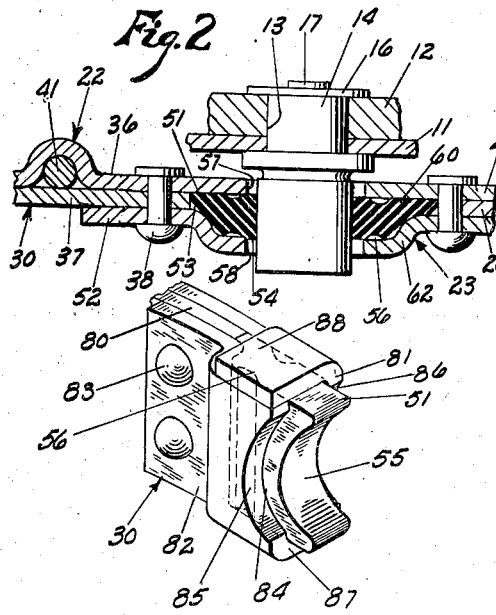
Fig. 2
Fig. 4
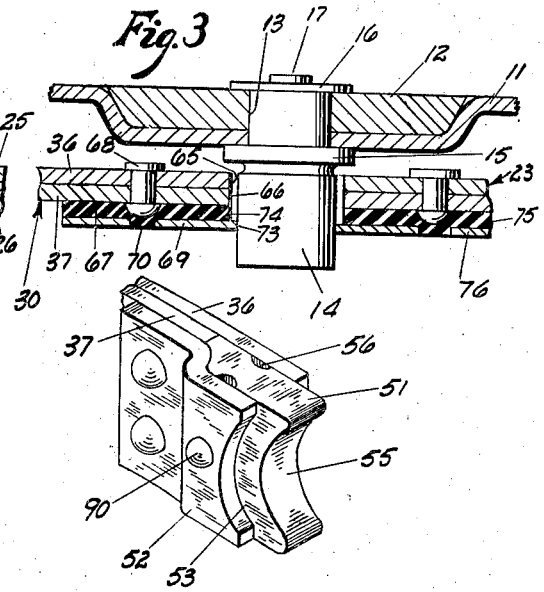
Fig. 3
Fig. 5
INVENTOR
GERHARD C.R. KUIPER
BY
ATTORNEY Patented Dec. 6, 1938

2,139,083

UNITED STATES PATENT OFFICE 2,139,083

VEHICLE BRAKE

Gerhard C. R. Kuiper, Cleveland, Ohio, assignor to The Midland Steel Products Company, Cleveland, Ohio, a corporation of Ohio Application August 21, 1935, Serial No. 37,191

7 Claims. (Cl. 188—78)

This invention relates to vehicle brakes and an important object of the invention is to eliminate the objectionable audible clicking noise incidental to the end of a brake shoe striking an anchor pin upon returning to brake release position.

Another object of the invention is to soften the impact between a brake shoe end and an anchor pin when the shoe returns to idle position and to eliminate any audible rattling tendencies between a brake shoe end and an anchor pin when the brake reposes in idle position.

A further object of the invention is to retard the movement of a brake shoe end toward an anchor pin.

Other objects and advantages of the invention will become apparent during the course of the following description.

In the drawing accompanying this specification and forming a part of this application, I have shown, for purposes of illustration, certain embodiments which my invention may assume, and in this drawing like numerals are employed to designate like parts throughout the several views, Fig. 1 is a partial elevational view of a brake shoe assembly including one embodiment of my anchor pin silencing means, herein shown disposed between an anchor pin and the adjacent ends of a brake shoe, Fig. 2 is a fragmentary sectional view corresponding substantially to the line 2—2 of Fig. 1, Fig. 3 is a fragmentary sectional view similar to Fig. 2, showing another embodiment of my anchor pin silencing means, Fig. 4 is a perspective view of one type of retaining means for holding the anchor pin silencing means, Fig. 5 is a perspective view of another type of retaining means for holding the anchor pin silencing means.

Referring to the drawing, the numeral 10 designates a brake drum the open face of which is closed by a backing plate 11 suitably mounted on a vehicle axle, not shown. A plate 12 for reinforcing the backing plate 11 adjacent an anchor pin 14 is mounted on the backing plate 11. The backing plate 11 and reinforcing plate 12 are provided with aligned openings for the reception of a reduced portion 13 of the anchor pin 14 which has an annular shoulder 15 abutting against the backing plate 11. The anchor pin 14 is rigidly affixed to the plates 11 and 12 by suitable means herein shown as a washer 16 and an upset end 17 of the anchor pin 14. Adjacent the anchor pin 14, the backing plate 11 is provided with an aperture through which one end of a brake operating flexible cable extends and is connected with a clevis 18 pivotally connected to a two arm toggle link 19 and a toggle link 20 employed for moving either end of a brake shoe 21 with respect to the anchor pin 14 to operate the brake.

The brake shoe herein illustrated comprises a split ring having spaced ends 22 and 23, the end 22 stopping short of the anchor pin 14 and the end 23 being disposed adjacent the anchor pin 14. The brake shoe 21 is of T-shape cross section having a peripheral web 24 and radial ribs 25 and 26 which are cut away as shown at 100 to lend flexibility to the end 22 of the brake shoe 21, and the uncut portion 27 of the radial ribs 25 and 26 render the adjacent web portions 28 and the end 23 of the brake shoe 21 substantially rigid. A brake lining 29 is mounted on the peripheral web 24 of the brake shoe 21.

The flexible end 22 of the brake shoe 21 is normally held in definite relation with respect to the anchor pin 14 by an adjuster 30 secured to an inwardly extending radial rib 35 of the brake shoe 21 by means of a pair of adjuster plates 36 and 37 held in position by suitable means, such as rivets 38. The adjuster 30 is controlled in its circumferential movement with respect to the brake shoe 21 by a screw device 39 as explained in the Sneed Patent No. 1,789,392 of January 20, 1931.

In order to connect the toggle mechanism with the two ends of the brake shoe 21, a toggle pin 41 is secured to the adjuster 30 as shown in Fig. 2, and a similar pin 42 is secured to the radial webs 25 and 26 adjacent the anchor pin 14 in a similar manner. The two armed toggle link 19 is pivotally connected to the toggle pin 41 with a roller 43 disposed between the arms thereof to provide rolling contact with the backing plate 11 while the toggle link 20 is pivotally connected to the toggle pin 42 with rollers 44 arranged on opposite sides of the toggle link 20 for rolling contact with the backing plate 11. Whenever the brake cable is operated to apply the brake, the elbow of the toggle links tend to straighten out and move one or the other of the ends of the brake shoe 21 away from the anchor pin 14, depending upon the direction of rotation of the drum 10. The brake shoe 21 is returned to and held in its normal position with respect to the anchor pin by means of interconnected retractor springs 45 which in turn are connected to the brake shoe as illustrated in Fig. 1. A second spring 46 has one end connected to the rib 27 of the rigid side of the brake shoe in chordal relation and in its other end connected to the backing plate 11 adjacent the retractor spring 45 so that greater effort is required to move the rigid end 23 of the brake shoe 21 than the flexible end 22 with the result that the latter is moved from the anchor pin 14 first to engage the brake lining 29 with the drum 10.

In order to silence the impact and prevent rattling between the anchor pin 14 and the free ends of the adjuster plates 36 and 37, a cushioning member 51 of any suitable sound deadening material such as rubber or the like, is inserted between the free ends of the adjuster plates 36 and 37 and the anchor pin 14.

A recess 53 for accommodating the cushion member 51 is formed between the adjuster plates 36 and 37 by terminating the adjuster plate 37 short of the adjuster plate 36 and securing a clamping member 52 to the exposed side of the adjuster plate 37. The rubber member 51 is suitably mounted within the recess 53, as by vulcanizing, and has an exposed portion 54 extending beyond the free ends of the adjuster plates 36 and 37 and the clamping member 52. The exposed portion 54 of the rubber member 51 is provided with an arcuate seat 55 conforming to the contour of the anchor pin 14, the arcuate seat 55 being in engagement with the anchor pin 14 when the brake is in released position. Disposed along opposite faces of the rubber member 51 are grooves 56 to allow the rubber member 51 to be compressed and move inwardly of the recess 53 whenever sufficient pressure is exerted upon the arcuate seat 55 of the rubber member 51. The adjuster plate 36 and the clamping plate 52 are also respectively provided with arcuate seats 57 and 58 which conform to the contour of the anchor pin 14 and are adapted to engage the latter should the arcuate seat 55 of the cushioning member 51 yield to a point inwardly of the arcuate faces 57 and 58.

A cushioning member 60, similar to the member 51, is also provided for the rigid end 23 of the brake shoe 21 and is mounted in a recess formed by the radial ribs 25 and 26 and a clamping member 62 similar to the clamping member 52.

In operation, assuming that the motor vehicle is moving in a forward direction, the direction of the drum rotation will then be counter-clockwise as viewed in Fig. 1. Application of braking power operates the toggle mechanism which spreads the flexible end of the brake shoe 21 away from the anchor pin 14 against the force exerted by the springs 45 to place the brake lining 29 into frictional engagement with the brake drum 10. The rotating brake drum of course tends to shift the flexible brake shoe end 22 still farther away from the anchor pin 14 and to move the more rigid brake shoe end 23 into firmer engagement with the anchor pin 14.

Upon removal of the braking force the springs 45 cause the flexible brake shoe end to move rapidly toward the anchor pin 14. And since the direction of drum rotation is counter-clockwise the rigid brake shoe end 23 is so close to the anchor pin 14 that when it engages the anchor pin 14 no audible sound will be produced from such engagement. Under some conditions if the flexible brake shoe end 22 returns rapidly to the anchor pin 14, without some method of reducing the shock of this engagement, an audible clicking may be heard due to the force and speed with which the flexible brake shoe end 22 approached the anchor pin 14. However, the arcuate seat 55 of the cushioning member 51 will engage the anchor pin 14 to reduce and cushion the impact of the flexible brake shoe end 22 against the anchor pin 14 and thereby preclude emission of sounds from the brake. Should the arcuate seat 55 of the cushioning member 51 yield inwardly of the arcuate seats 57 and 58, then these latter seats will engage the anchor pin 14, but the force of this engagement will have been so reduced as not to produce any audible sound.

When the vehicle is moving in a backward direction and the brake is applied, the rotation of the drum 10 tends to shift the rigid brake shoe end 23 from the anchor pin 14. Upon removal of the braking force the rigid brake shoe end 23 is moved to released position toward the anchor pin 14 by means of the springs 45 and 46. The cushioning member 60 engages the anchor pin 14 to reduce and soften the impact of the rigid brake shoe end 23 against the anchor pin 14 in the same manner as described in connection with the cushion member 51.

Accordingly, it is apparent that the anchor pin 14 is not subjected to violent impacts from the brake shoe ends and the connection of the anchor pin 14 with the backing plate 11 is not impaired.

Since the cushion members 51 and 60 are at all times disposed between the brake shoe end and the anchor pin 14 they will prevent any rattling between the metal ends of the brake shoe and the anchor pin 14 that might otherwise occur when the brake is in released position.

Referring to Fig. 3 the embodiment of the invention therein disclosed comprises the adjuster plates 36 and 37 provided respectively with arcuate seats 65 and 66 conforming to the contour of the anchor pin 14. Mounted on the adjuster plate 37 is a cushioning member 67 of sound deadening material such as rubber, or the like, which is provided with a recess to accommodate the head of a rivet 68 securing the adjuster plates 36 and 37 together. An impact or silencing member 69, for receiving the force of the impact caused by engagement of the brake shoe end with the anchor pin 14 is vulcanized on to the rubber member 67 causing the extrusion 70 of rubber through an opening 71 in the impact member 69.

The impact member 69 and cushion member 67 are respectively provided with arcuate seats 73 and 74 conforming to the contour of the anchor pin 14. The arcuate seat 73 extends beyond the arcuate seat 74 and normally engages the anchor pin 14 when the brake is in or returns to released position to maintain the arcuate metallic seats 65 and 66 and the rubber seat 74 spaced from the anchor pin 14.

A cushioning member 75 and an impact member 76, similar respectively to the cushion member 67 and impact member 69, are also mounted on the rigid end 23 of the brake shoe 21.

The brake shoe ends of Fig. 3 are moved from and toward the anchor pin 14 in the same manner as described in connection with Figs. 1 and 2. In this instance however, when the vehicle is moving in a forward direction and the brake applying force is removed, the arcuate seat 73 of the impact member 69 first engages the anchor pin 14 upon retractive movement of the flexible end of the brake shoe. Since the impact member 69 is mounted upon the cushion member 67 the latter will yield and thereby cushion and silence the impact of the member 69 with the anchor pin 14. This engagement will be had without producing any audible sound. Should the cushion member 67 yield to such an extent that the arcuate seat 73 of the impact member 69 is in alignment with the arcuate seats 65, 66 and 74, then the latter arcuate seats will also engage the anchor pin 14, but when such engagement is made the movement of the flexible brake shoe end is so retarded and the force of engagement so reduced by the yielding of the cushion member 67 that no audible sound will be produced.

Upon backward movement of the vehicle the cushion member 75 and the impact member 76 operate to soften and reduce the impact of the rigid brake shoe end 23 against the anchor pin 14 when the brake is released, as will be understood.

Fig. 4 illustrates another form of holding means for the cushion member 51 and comprises end plates 80 and 81, which form part of the adjuster 30 and a clamping member 82 having an offset portion secured to the adjuster plates 80 and 81 by rivets 83. A recess 84 for accommodating the cushion member 51 is formed between the adjuster plate 81, the clamping member 82 and the adjuster plate 80 which terminates short of arcuate faces 85 and 86 respectively provided on the clamping member 82 and adjuster plate 81. The clamping member 82 and the adjuster plate 81 are respectively provided with flanges 87 and 88 extending in opposite directions to span the recess 84 and confine the cushion member 51 in the recess 84. The cushion member 51 is also, in this embodiment, provided with grooves 56 to allow the resilient member 51 to be compressed inwardly of the arcuate seats 85 and 86.

The holding means shown in Fig. 5 is similar to that shown in Fig. 2, with the exception that the cushion member 51 is secured within the recess 53 by means of a rivet 90 extending through the clamping member 52, the sound deadening member 51 and the adjuster plate 36.

It is to be understood that various changes in the size, shape, arrangement of parts and operation of the same may be resorted to without departing from the spirit of the invention or the scope of the appended claims.

I claim:

1. In a brake, an anchor pin, a brake shoe having one end thereof engageable with said anchor pin, and cushioning means constituted solely of rubber and interposed beween said brake shoe and said anchor pin.

2. In a brake, an anchor pin, a brake shoe having one end thereof movable into engagement with said anchor pin, and means for engaging said anchor pin prior to said engagement of said brake shoe end with said anchor pin to retard movement of said brake shoe end toward said anchor pin.

3. In a brake, an anchor pin, a brake shoe having one end thereof movable toward said anchor pin, means constituted solely by a single resilient member interposed between said anchor pin and said brake shoe end adapted to directly engage said anchor pin to cushion said movement of said brake shoe end toward said anchor pin, and spaced members forming part of said brake shoe and defining a pocket for securing said cushioning means in position at said brake shoe end.

4. In a brake, an anchor pin, a brake shoe having an end thereof movable toward said anchor pin, and cushioning means constituted solely of rubber interposed between said anchor pin and brake shoe end and having a portion contoured complementary to said anchor pin for engagement therewith to retard movement of said brake shoe end toward said anchor pin, and having a cutout portion to permit flexing of the rubber during braking to maintain said rubber lively and thus prolong the useful life of said rubber.

5. In a brake, an anchor pin, a brake shoe having a radially extending web at an end thereof, a member spaced from said web and cooperating therewith to define a pocket, and cushioning means constituted solely of a flexible member having a portion disposed in said pocket and another portion adapted to engage said anchor pin to retard movement of said brake shoe end toward said anchor pin.

6. In a brake, an anchor pin, a brake shoe having a radially extending web at an end thereof, a member spaced from said web and cooperating therewith to define a pocket, and cushioning means constituted solely of rubber having a portion disposed in said pocket and another portion adapted to engage said anchor pin to retard movement of said brake shoe end toward said anchor pin, said rubber having cut out portions in the portion in said pocket to permit flexing of said rubber inwardly of said pocket during braking.

7. In a brake, an anchor pin, an annular one piece brake band having one end thereof movable toward and away from contact with said anchor pin, and means constituted solely by a single resilient member interposed between said anchor pin and said brake shoe end, said resilient member having a portion thereof contoured complementary to only a part of the circumference of said anchor pin to directly engage only the corresponding portion of said anchor pin for retarding movement of said brake shoe end toward said anchor pin upon applying the brake.

GERHARD C. R. KUIPER.